United States Patent
Sasa et al.

(10) Patent No.: US 8,134,295 B2
(45) Date of Patent: Mar. 13, 2012

(54) VEHICLE LAMP CONTROL SYSTEM AND CONTROL METHOD

(75) Inventors: Manabu Sasa, Shizuoka (JP); Masashi Yamazaki, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 429 days.

(21) Appl. No.: 12/369,858

(22) Filed: Feb. 12, 2009

(65) Prior Publication Data

US 2009/0200947 A1 Aug. 13, 2009

(30) Foreign Application Priority Data

Feb. 13, 2008 (JP) .................................. 2008-031311

(51) Int. Cl.
*B60Q 1/26* (2006.01)
*G06F 7/00* (2006.01)
*H01L 27/00* (2006.01)

(52) U.S. Cl. ................ 315/80; 701/49; 701/48; 701/36; 701/37; 250/208.1

(58) Field of Classification Search .................... 315/80, 315/82, 77–79; 701/36–37, 48–49; 307/10.1, 307/10.8
See application file for complete search history.

(56) References Cited

U.S. PATENT DOCUMENTS

| | | | | |
|---|---|---|---|---|
| 6,229,263 | B1 * | 5/2001 | Izawa | 315/80 |
| 6,817,741 | B2 * | 11/2004 | Toda et al. | 362/466 |
| 6,924,616 | B2 | 8/2005 | Yamamoto et al. | |
| 7,552,001 | B2 * | 6/2009 | Ando | 701/49 |
| 2003/0169587 | A1 | 9/2003 | Uchida | |
| 2004/0085780 | A1 | 5/2004 | Hayami | |
| 2004/0138798 | A1 * | 7/2004 | Izawa et al. | 701/49 |
| 2006/0291222 | A1 * | 12/2006 | Ando | 362/466 |
| 2007/0035268 | A1 | 2/2007 | Goto et al. | |
| 2007/0168099 | A1 * | 7/2007 | Nakazawa et al. | 701/49 |
| 2008/0084286 | A1 * | 4/2008 | Teramura et al. | 340/438 |

FOREIGN PATENT DOCUMENTS

| | | |
|---|---|---|
| CN | 19157711 A | 2/2007 |
| EP | 1 498 309 A2 | 1/2005 |
| EP | 1 714 831 A1 | 10/2006 |
| EP | 1714831 A1 * | 10/2006 |
| JP | 2003-260980 | 9/2003 |

OTHER PUBLICATIONS

Communication (and English-language translation) from the State Intellectual Property Office of the Peoples' Republic of China in Patent Application No. 200910006937.9 (dated Nov. 29, 2010).
Extended European Search Report in Application No. 09001988.6 (Dec. 8, 2010).

* cited by examiner

*Primary Examiner* — Shawki S Ismail
*Assistant Examiner* — Thienvu Tran
(74) *Attorney, Agent, or Firm* — Fish & Richardson P.C.

(57) ABSTRACT

A vehicle lamp control system includes a target irradiating direction setting unit which sets, in accordance with a running condition of a vehicle, a target irradiating direction of the lamp. An actuator controls an irradiating direction of the lamp to be directed in the target irradiating direction based on a reference direction. The actuator includes a reference setting section which executes a reference setting operation to set the irradiating direction of the lamp to be directed in the reference direction. The target irradiating direction setting unit includes a condition determining section which determines whether the reference setting section has executed the reference setting operation, and a reference setting command section which, when the condition determining section determines that the reference setting section has not yet executed the reference setting operation, instructs the reference setting section to execute the reference setting operation.

6 Claims, 5 Drawing Sheets

VEHICLE LAMP CONTROL SYSTEM AND CONTROL METHOD

CROSS-REFERENCE TO RELATED APPLICATION(S)

The present application claims the benefit of priority of Japanese Patent Application No. 2008-031311, filed on Feb. 13, 2008, The disclosure of which is incorporated herein by reference.

TECHNICAL FIELD

The present disclosure relates to a system which vertically or horizontally controls an irradiating direction of a vehicle lamp, such as a headlamp or a supplementary lamp of an automobile, and more specifically, to a vehicle lamp control system having an actuator for controlling the irradiating direction and to a vehicle lamp control method.

BACKGROUND

Automobiles having an auto-leveling system or an AFS (Adaptive Front-lighting System) are being proposed. The auto-leveling system controls an irradiating direction of headlamps in vertical directions to prevent dazzling oncoming drivers as the result of a change in orientation of the automobile. The AFS controls the irradiating direction to swivel in the right and left directions (e.g. during cornering), to illuminate the direction of travel of the automobile to improve visibility for drivers. Such automobiles are configured to control auto-leveling actuators or swivel actuators, which are provided in a respective lamp, with an ECU (Electronic Control Unit). More specifically, the ECU sends irradiating direction signals to each of the actuators, and each of the actuators controls the irradiating direction of the corresponding lamp based on the irradiating direction signals. However, to improve control of the respective actuators, various control signals need to be transmitted between the ECU and the respective actuators, which increases the number of harnesses coupling therebetween. In such a case, the configuration of the system and maintenance thereof becomes complicated.

To address this problem, SACTs (Smart ACTuators) are being proposed. The SACTs are configured by integrating a microcomputer and various sensors into the actuator to enable separate control from the ECU. According to such a configuration, the SACTs can take over some of the controls from the ECU, so that the number of harnesses between the actuators and the ECU can be reduced. For example, in some situations, an actuator is controlled by the ECU and also has its own microcomputer (a sub-CPU). Feedback control is executed between the actuator and the ECU with respect to the irradiating direction of the lamp, whereby the signals transmitted between the actuator and the ECU as well as the number of harnesses are reduced (see, e.g., Japanese Patent Document JP 2003-260980 A).

For the purpose of downsizing and weight reduction, SACTs use a stepping motor or a DC brushless motor as a driving source for changing the irradiating direction of the lamp. Further, for the purpose of downsizing and cost reduction, the SACTs are not provided with an encoder or a potentiometer which can detect absolute rotational positions of the motor and the irradiating direction. Therefore, although the amount of change in the irradiating direction can be detected as a rotational amount of the motor, the absolute rotational position of the irradiating direction is not detected. Accordingly, to control the absolute position of the irradiating direction, it is necessary to set a reference angular position in advance through a mechanical operation, and to execute directional controls in accordance with an amount of change from the reference angular position. Thus, when the power is turned on so that the SACT is initialized, a reference setting operation for setting the reference angular position is required. In such systems, when the power is turned on so that the ECU is initialized, the ECU sends a reset signal to the SACT to cause the SACT to execute the reference setting operation.

Some systems are configured to provide an independent power supply path for each of the ECU and the SACT, or to provide the ECU and the SACT with CPUs having different specifications, such as set timings. In the systems having such a configuration, in some cases, the ECU and the SACT are separately initialized. For example, only the ECU may be initialized or only the SACT may be initialized. However, as described above, the ECU is configured to send, when it is initialized, the reset signal to cause the SACT to execute the reference setting operation. Therefore, when only the ECU is initialized during a state in which the SACT has not been initialized after the previous reference setting operation, the SACT receives the reset signal from the ECU and again executes the reference setting operation for setting the reference angular position, in spite of the situation that the SACT is already capable of proper operation based on a direction control signal. That is, in a certain situation, the reference setting operation is unnecessarily performed, resulting in a waste of a time until the irradiating direction control is initiated.

On the other hand, when only the SACT is initialized, the reference setting operation for setting the reference angular position is not executed in the SACT because the reset signal is not sent from the ECU. In such a situation, therefore, the SACT cannot properly control the irradiating direction based on the direction control signal from the ECU and, as a result, the irradiating direction of the lamp is directed toward the wrong direction. In this case, it is possible to restore the SACT to a normal condition if the ECU is initialized. However, depending on system configuration, the system may indicate an alert and execute unnecessary fail-safe control upon detection of system malfunction, which unnecessarily causes the driver to feel anxious.

SUMMARY

The present disclosure addresses the problems described above.

According to an aspect of the present invention, a vehicle lamp control system includes a target irradiating direction setting unit configured to set, in accordance with an operating condition of a vehicle, a target irradiating direction of the lamp. An actuator is configured to control, based on a reference direction, an irradiating direction of the lamp to be directed in the target irradiating direction. The actuator includes a reference setting section arranged to execute a reference setting operation to set the irradiating direction of the lamp to be directed in the reference direction. The target irradiating direction setting unit includes a condition determining section which determines whether the reference setting section has executed the reference setting operation, and a reference setting command section which, when the condition determining section determines that the reference setting section has not yet executed the reference setting operation, instructs the reference setting section to execute the reference setting operation.

According to another aspect of the present invention, a method for controlling a vehicle lamp includes determining whether an irradiating direction of the lamp is set to be directed in a reference direction. If it is determined that the irradiating direction of the lamp is not yet set to be directed in the reference direction, the irradiating direction of the lamp is set to be directed in the reference direction. The method includes calculating a target irradiating direction of a lamp in accordance with a running condition of the vehicle, and controlling the irradiating direction of the lamp to be directed in the target irradiating direction based on the reference direction.

Other aspects and advantages of the invention will be apparent from the following description, the drawings and the claims.

DETAILED DESCRIPTION

Figure 1:
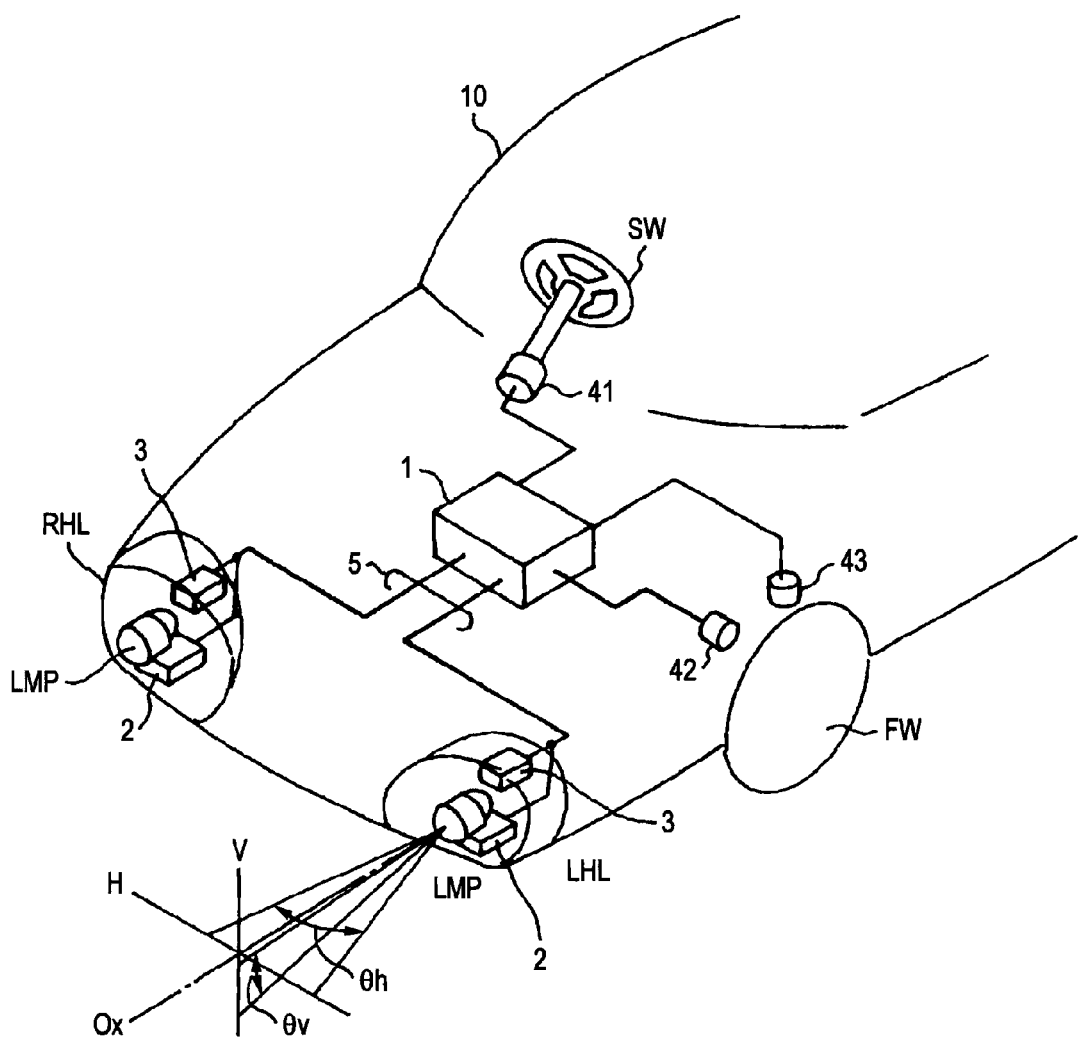
FIG. 1 is a schematic configuration diagram of a system according to an embodiment of the present invention.

As shown in the example of FIG. 1, headlamps RHL, LHL are arranged in right and left portions of the front side of a vehicle 10 to illuminate the forward region of the vehicle 10. Each of the headlamps RHL, LHL includes a lamp LMP which is tiltable in lateral and vertical directions inside, a swivel SACT (Swivel Smart ACTuator) 2, and a leveling SACT (Leveling Smart ACTuator) 3. The swivel SACT 2 controls the irradiating direction of the lamp LMP to swivel in the lateral direction, including a straight-ahead direction Ox of the vehicle 10, within the range of an angle θh. The leveling SACT 3 controls the irradiating direction of the lamp LMP in the vertical direction within the range of an angle θv. The swivel SACT 2 and the leveling SACT 3 control the irradiating direction based on respective direction control signals sent from an ECU (Electronic Control Unit) 1. Further, the swivel SACT 2 and the leveling SACT 3 are configured to be able to execute a reference setting operation for setting the irradiating direction of the corresponding lamp LMP to serve as a reference direction (i.e., to serve as a reference angular position).

In the vehicle 10, the swivel SACT 2 and the leveling SACT 3 of each of the headlamps RHL, LHL are coupled to the ECU 1 through a respective harness which is a part of an in-vehicle LAN 5. The ECU 1 is configured as a target irradiating direction setting unit, to which a steering angle sensor 41, a vehicle speed sensor 42, and vehicle height sensors 43 are coupled. The vehicle steering sensor 41 detects a steering angle of a steering wheel SW operated by a driver. The vehicle speed sensor 42 detects the speed of the vehicle 10. The vehicle height sensors 43 detect a vehicle height for calculating a pitch angle of the vehicle body (i.e., an angle at which the front portion of the vehicle body inclines with respect to the horizontal line). Although the vehicle height sensors 43 are provided near the front wheel and the rear wheel portion of the vehicle 10, respectively, FIG. 1 only illustrates the vehicle height sensor 43 near the front wheel FW. Based on the detection output signals from the sensors 41 to 43, the ECU 1 calculates a target irradiating direction of the headlamps RHL, LHL, and sends direction control signals indicative of the calculated target irradiating direction to each of the swivel SACTs 2 and the leveling SACTs 3. In response to the direction control signals, the SACTs 2, 3 control the irradiating direction.

Figure 2:
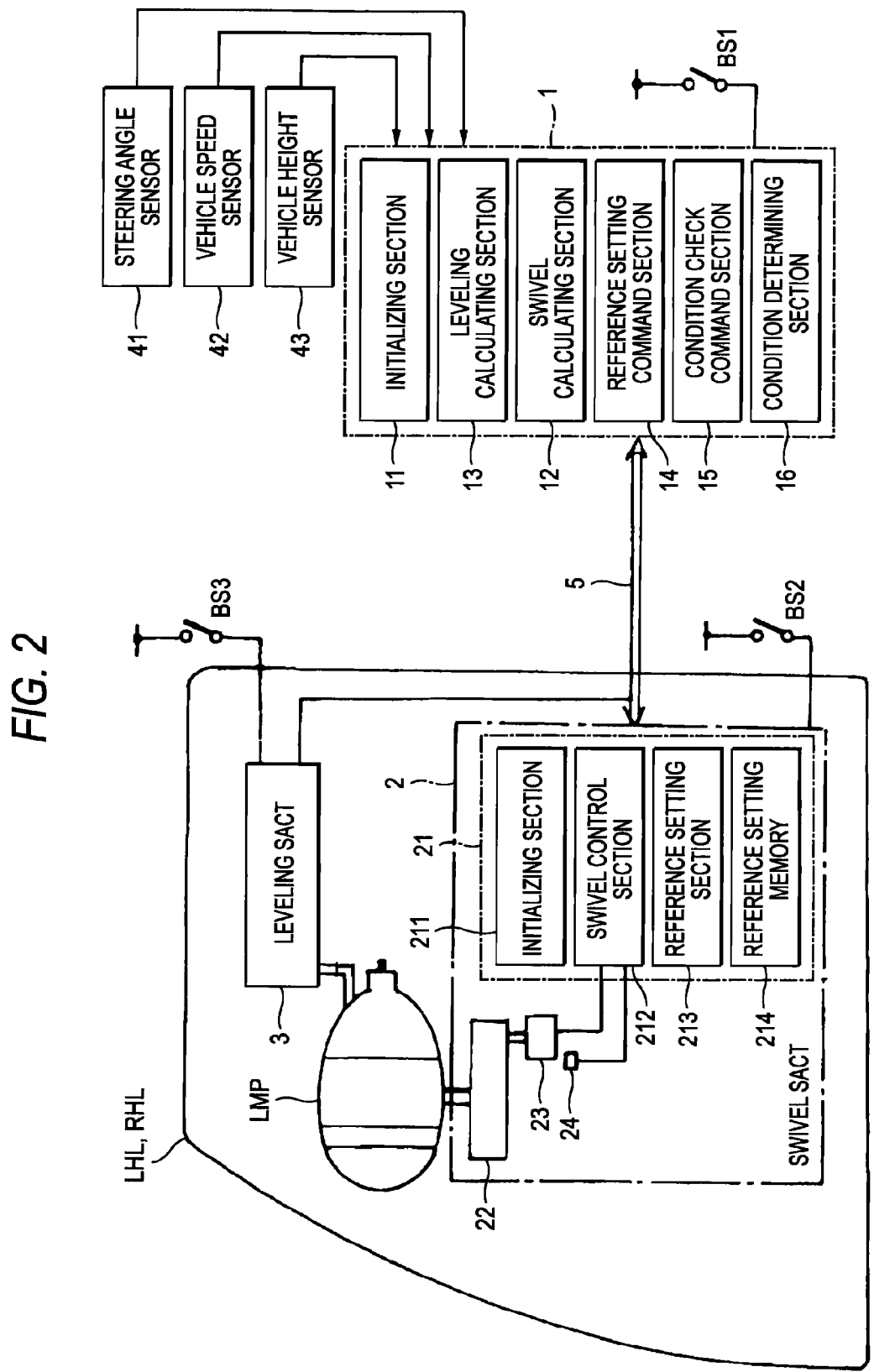
FIG. 2 is a detailed block diagram of the system.

FIG. 2 is a block diagram illustrating the configuration of the ECU 1, and the swivel and leveling SACTs 2, 3 provided in each of the headlamps RHL, LHL. The ECU 1 and the SACTs 2, 3 are coupled through the in-vehicle LAN 5 and are coupled to an in-vehicle power supply (not shown) respectively through individually-provided power supply switches BS1, BS2, BS3 (i.e., through separate power supply switches BS1, BS2, BS3) when the power supply switches BS1, BS2, BS3 are turned on. Usually, the power supply switches BS1 to BS3 are turned on and off all at once. However, in some situations, only one of the power supply switches BS1 to BS3 is turned on and off. Each of the ECU 1 and the SACTs 2, 3 are configured, respectively, to execute a respective initialization processing when a corresponding one of the power supply switches BS1 to BS3 is turned on.

The ECU 1 includes a swivel calculating section 12 and a leveling calculating section 13. The swivel calculating section 12 calculates a target swivel direction of the lamp LMP based on the steering angle detected by the steering angle sensor 41 and the vehicle speed detected by the vehicle speed sensor 42. The swivel calculating section 12 then provides a swivel control signal for swivel control in the swivel SACT 2 based on the calculated target swivel direction. The leveling calculating section 13 calculates a pitch angle of the vehicle calculated based on the detections of the vehicle height sensors 43a to calculate a target leveling direction of the lamp LMP. The leveling calculating section 13 then provides a leveling control signal for leveling control in the leveling SACT 3 based on the calculated target leveling direction. The ECU 1 further includes an initializing section 11, a reference setting command section 14, a condition check command section 15, and a condition determining section 16. The initializing section 11 executes an initialization processing of the ECU 1 itself when the power is turned on (i.e., when the power supply switch BS1 is turned on). The reference setting command section 14 sends a respective reset signal to each of the SACTs 2, 3 to cause the SACTs 2, 3 to execute the respective reference setting operations with respect to the irradiating direction of the lamp LMP. The condition check command section 15 sends a respective condition check signal to each of the SACTs 2, 3 to check whether the respective reference setting operations have been executed or not. The condition determining section 16 receives a condition signal, which is sent from each of the SACTs 2, 3 in response to the condition check signal, and determines whether the reference setting operation have been executed in each of the SACTs 2, 3.

The swivel SACT 2 includes a mechanical section 22, a motor 23, a sensor 24, and a control circuit section 21. The mechanical section 22 includes, for example, a gear mechanism to directly control the lamp LMP to change the irradiating direction the lamp LMP in the lateral direction. The motor 23 is a driving source of the mechanical section 22, and can be, for example, a stepping motor or a DC motor. The sensor 24 detects at least a rotational amount of the motor 23. The control circuit section 21 can include, for example, a microcomputer, and controls the rotational position of the motor 23 based on the output from the sensor 24. The control circuit section 21 includes an initializing section 211, a swivel control section 212, a reference setting section 213, and a reference setting memory 214. The initializing section 211 executes an initialization processing of the swivel SACT 2 itself when the power switch BS2 is turned on. Based on the swivel control signal from the ECU 1, the swivel control section 212 drives the motor 23 and the mechanical section 22 to set the irradiating direction of the lamp LMP to be the target irradiating direction corresponding to the swivel control signal. Based on the reset signal from the ECU 1, the reference setting section 213 sets the irradiating direction of the lamp LMP to be the reference direction (to be in the reference angular position). Information indicating the reference setting operation has been executed is stored in the reference setting memory 214. When the swivel SACT 2 is initialized, the reference setting memory 214 is also initialized. Therefore, it is only when the reference setting operation is executed after the initialization processing that the information is stored in the reference setting memory 214.

Although the leveling SACT 3 is different from the swivel SACT 2 in that a mechanical section of the leveling SACT 3 is configured to change the irradiating direction of the lamp LMP in the vertical direction, other aspects of the leveling SACT 3, including configuration of the control circuit section, are basically the same as those of the swivel SACT 2.

Swivel control of the headlamp in the system having the configuration described above is now described. The leveling control is similar to the swivel control. In the swivel control of the lamp LMP, the ECU 1 calculates, in the swivel calculating section 12, the target swivel direction based on the steering angle and the vehicle speed, and provides the swivel control signal corresponding to the calculated target swivel direction. In the swivel SACT 2, the swivel control section 212 drives the motor 23 based on the swivel control signal from the ECU 1, and at the same time, feedback control is executed with respect to rotation of the motor 23 which is detected by the sensor 24. In this way, the mechanical section 22 is driven by rotation of the motor 23 to swivel the lamp LMP in the horizontal direction, whereby the irradiating direction of the lamp LMP is automatically set to be the target swivel direction.

Prior to swivel control of the lamp LMP, the swivel SACT 2 executes the reference setting operation with respect to the irradiating direction of the lamp LMP in accordance with an instruction from the ECU 1. As the swivel SACT 2 is not provided with means for detecting the absolute rotational position of the motor 23, the swivel SACT 2 first finds the reference angular position through the reference setting operation, and thereafter, controls the rotational position of the motor 23 (i.e. controls the irradiating direction) by changing a relative angle with respect to the reference angular position.

Figure 3:
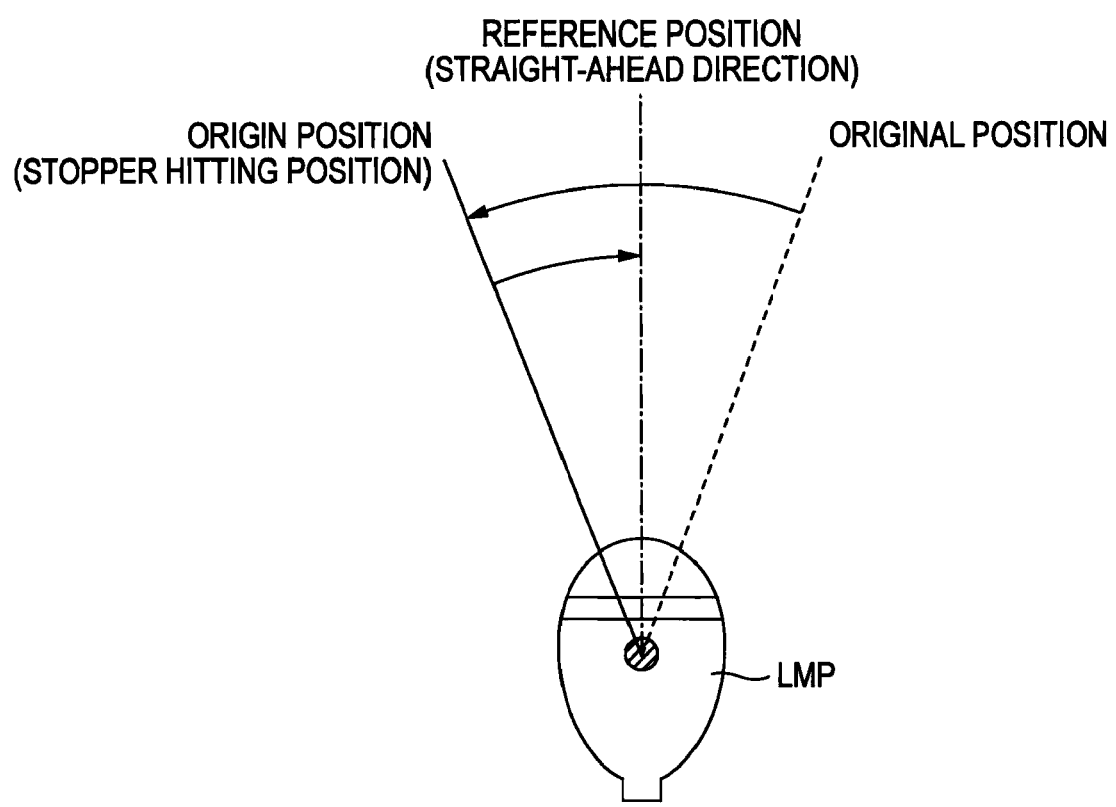
FIG. 3 is a schematic diagram for illustrating reference setting.

The reference setting operation is described with reference to FIG. 3. First, the reference setting section 213 of the swivel SACT 2 drives the motor 23 to rotate the lamp LMP until it hits either one of right and left stoppers. In the example of FIG. 3, the lamp LMP is rotated leftward from the original position. The angular position at which the stopper is hit is recognized as an origin angular position, and then the reference setting section 213 of the swivel SACT 2 rotates in reverse (rightward in the example of FIG. 3) the lamp LMP from the origin angular position by a given amount. The angular position after this reverse rotation is the reference angular position. In this example, the reference angular position is set to be in the straight-ahead direction (Ox) of the vehicle. Therefore, after the reference setting operation, the irradiating direction of the lamp LMP is set to be the straight-ahead direction (Ox) of the vehicle. This reference setting operation enables the swivel control section 212 to calculate an angular difference between the target swivel direction input from the ECU 1 and the reference angular position, and to rotate the motor 23 by an amount of the calculated angular difference. In this way, swivel control of the irradiating direction of the lamp LMP is implemented.

Figure 4:
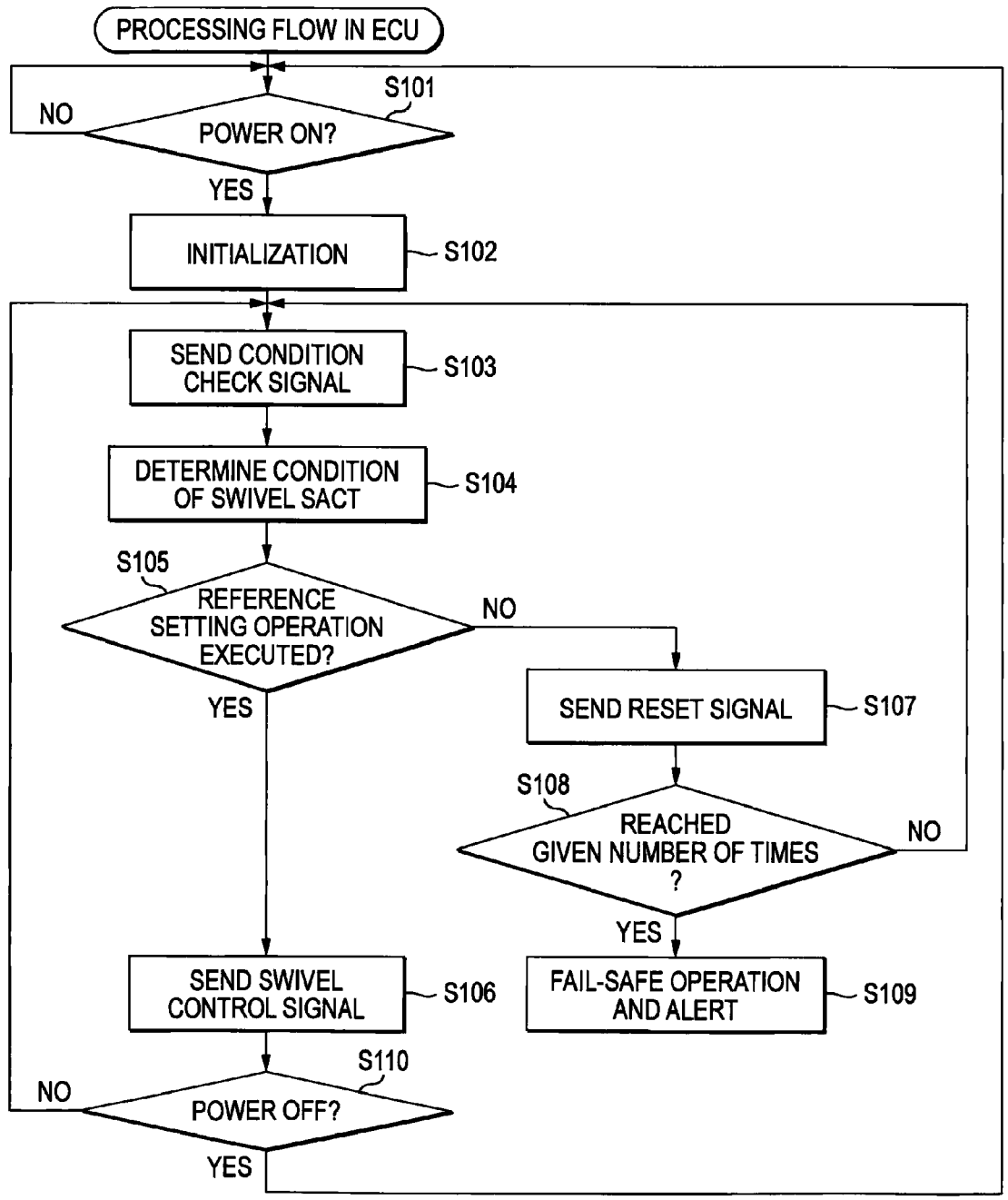
FIG. 4 is a flowchart of processes to be executed in an ECU.
Figure 5:
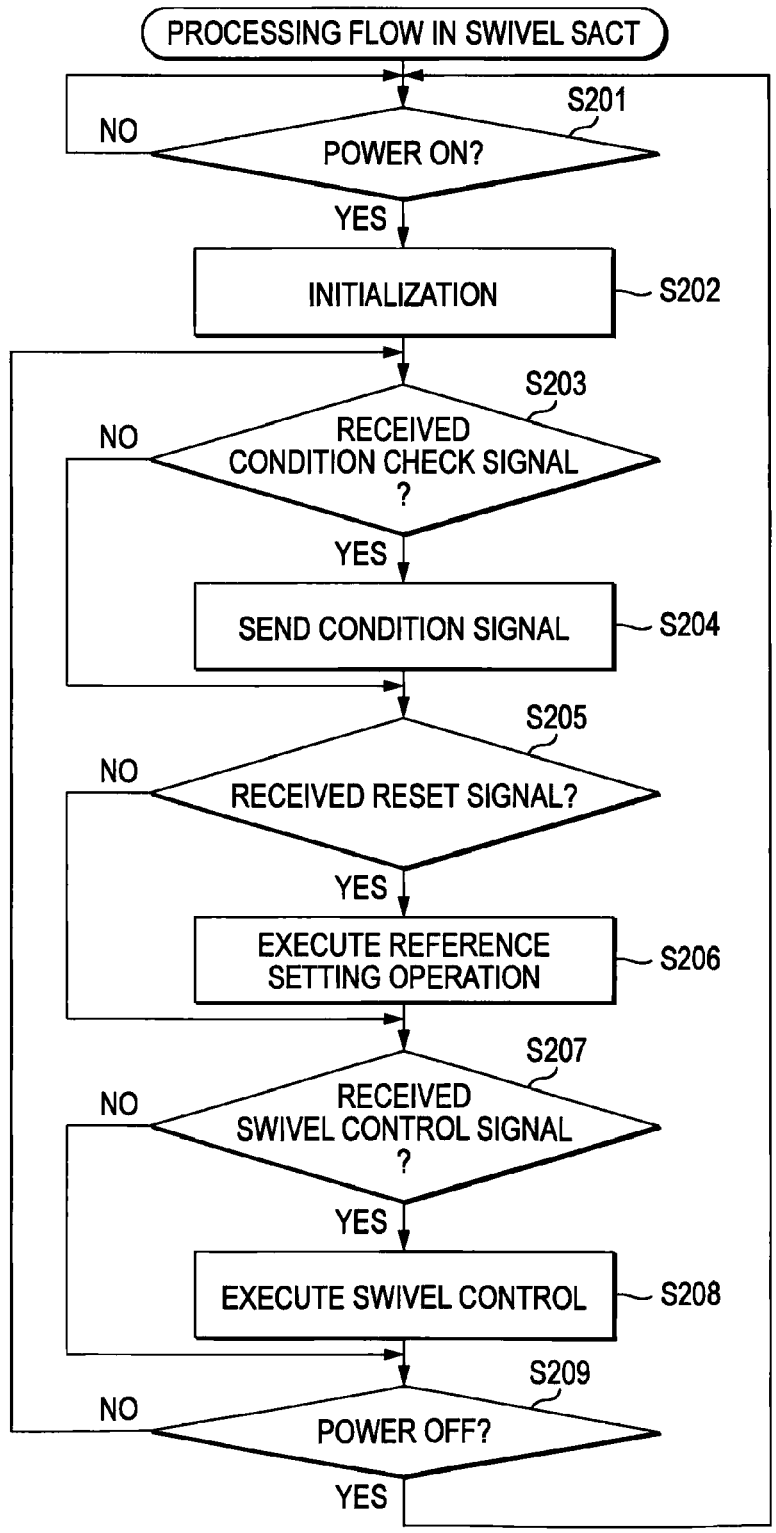
FIG. 5 is a flowchart of processes to be executed in a swivel SACT.

The reference setting operation and swivel control in the system are described in more detail with reference to the flowcharts of FIG. 4 and FIG. 5. As shown in FIG. 4, the ECU 1 determines whether the power switch BS1 is turned on or not (S101). If it is determined that the power switch BS1 is turned on, the initializing section 11 executes the initialization processing (S102). This process is similar in the swivel SACT 2. That is, as shown in FIG. 5, the SACT 2 determines whether the power switch BS2 is turned on or not (S201), and if it is determined that the power switch BS2 is turned on, the initializing section 211 executes the initialization processing (S202). As shown in FIG. 4, when the initialization processing is completed, the condition check command section 15 sends the condition check signal to the swivel SACT 2 to check whether the reference setting operation has been executed or not (S103). As shown in FIG. 5, upon receipt of the condition check signal (S203), the swivel SACT 2 sends the condition signal to the ECU 1 (S204). The condition signal indicates the information stored in the reference setting memory 214, i.e., indicates that the reference setting operation has been executed when the initialization processing and the reference setting operation have been already be executed, and indicates that the reference setting operation has not been executed when the reference setting operation is not yet executed.

As shown in FIG. 4, upon receipt of the condition signal from the swivel SACT 2, the condition determining section 16 determines the condition of the swivel SACT 2 (S104). If the condition determining section 16 determines that the reference setting operation has been executed in the swivel SACT (S105: YES), the swivel calculation section 12 calculates the target swivel direction as described above, and sends the swivel control signal corresponding to the calculated target swivel direction to the swivel SACT 2 (S106). As shown in FIG. 5, upon receipt of the swivel control signal from the ECU 1 (S207), the swivel control section 212 executes the swivel control of the lamps LMP to match the irradiating direction of the lamps LMP to the target swivel direction indicated by the swivel control signal (S208).

On the other hand, if the condition determining section 16 of the ECU 1 determines that the reference setting operation has not been executed in the swivel SACT (S105: NO) (i.e. when the swivel SACT 2 has been initialized but is not yet executed the reference setting operation), the reference setting command section 14 send the reset signal to the swivel SACT 2 to cause the swivel SACT 2 to execute the reference setting operation (S107). As shown in FIG. 5, upon receipt of the reset signal (S205), the swivel SACT 2 executes the reference setting operation (S206). In this reference setting operation, the irradiating direction of the lamp LMP is set to the reference angular position as described above, and when the reference setting operation is completed, the information that the reference setting operation has been executed is stored in the reference setting memory 214. Therefore, when the swivel SACT 2 again receives the condition check signal from the ECU 1 after completing the reference setting operation, the swivel SACT 2 sends, to the ECU 1, and based on the information stored in the reference setting memory 214, the condition signal indicating that the reference setting operation has been executed. In fact, as shown in FIG. 4, the ECU 1 again sends, from the condition check command section 15, the condition check signal to the swivel SACT 2 (S103) after sending the reset signal from the reference setting command section 14, and determines the condition of the swivel SACT 2 (S104). In the event that the condition determining section 16 cannot confirm completion of the reference setting operation in the SACT 2 after repeating the above process flow for a given number of times (S108: YES) (e.g., twice or three times), it is determined that the swivel SACT 2 is in an abnormal state, whereby a fail-safe control is executed and an alert is generated (S109). In the fail-safe control, in either one of the swivel SACTs 2 of the right and left headlamps RHL, LHL that is determined as being abnormal, the irradiating direction is fixed at the current position. In the other swivel SACT that is determined as being normal, the irradiating direction is controlled to be in the straight-ahead direction of the vehicle. In this way, it is possible to illuminate the forward region of the vehicle to ensure driving safety while reducing the likelihood of dazzling oncoming drivers.

As shown in FIG. 4, after executing the swivel control, the ECU 1 determines whether the power supply switch BS1 is turned off or not (S110). If it is determined that the power supply switch BS1 is still on, the process returns to Step S103 to check the condition of the swivel SACT 2. If it is determined that the power supply switch BS1 is turned off, the process returns to Step S101. When the power switch BS1 is turned on again, the subsequent process flow starts from Step S102 to initialize the ECU 1. That is, the ECU 1 is initialized when the power supply of the ECU 1 that has been turned off is subsequently turned on, but is not initialized again as long as the power supply remains on. After the initialization processing, it is determined whether the swivel SACT 2 has executed the reference setting operation or not. If it is determined that the swivel SACT 2 has not yet executed the reference setting operation, the swivel SACT 2 is caused to execute the reference setting operation. When the reference setting operation is completed in the swivel SACT 2, the swivel control is executed in a normal manner.

According to the system described above, after the ECU 1 is initialized, the condition check signal is sent to the swivel SACT 2. Further, during the normal continuous operation of the ECU 1, the condition check signal is periodically sent to the swivel SACT 2 to check, based on the condition signal that is sent from the swivel SACT 2 in response to the condition check signal, whether the swivel SACT 2 has executed the reference setting operation or not. The ECU 1 instructs the swivel SACT 2 to execute the reference setting operation only if it is determined that the swivel SACT 2 has not yet executed the reference setting operation. If it is determined that the swivel SACT 2 has executed the reference setting operation, the swivel control is immediately executed. Therefore, in a case in which the swivel SACT 2 has already executed the reference setting operation and only the ECU 1 is initialized thereafter, the swivel control is immediately executed without executing unnecessary reference setting operations in the swivel SACT 2. Accordingly, it is possible to avoid the time that the system otherwise would have to wait for the swivel control until unnecessary reference setting operation in the swivel SACT 2 is completed, and to shift smoothly to the swivel control without giving any discomfort to the driver.

Furthermore, when only the swivel SACT 2 is initialized, the ECU 1 immediately determines that the reference setting operation is not executed in the swivel SACT 2 and instructs the swivel SACT 2 to execute the reference setting operation, and once it is determined that the reference setting operation is completed, executes the swivel control. Therefore, it is possible to prevent the ECU 1 from executing the swivel control with respect to the swivel SACT 2 that has not yet executed the reference setting operation. That is, it is possible to avoid a situation where abnormal swivel control is executed in the swivel SACT 2 by an erroneous input of the swivel control signal. Accordingly, the irradiating direction of the headlamps RHL, LHL is prevented from being directed in a wrong irradiating direction, which may otherwise cause an erroneous recognition that the entire system, especially the ECU 1, is in an abnormal state. As a result, it is possible to avoid a situation in which the driver becomes anxious as the result of unnecessary alert or a situation in which an imaginary abnormality is recorded in the failure history. Moreover, unnecessary initialization of the ECU 1 for restoring the system can be avoided.

Although the foregoing description has been made in connection with the control between the ECU 1 and the swivel SACT 2, the present invention is also applicable to control between the ECU 1 and the leveling SACT 3. In fail-safe control under an abnormal state of the leveling SACT 3, the leveling control of the leveling SACT 3 that is determined to be abnormal is stopped at the current angular position, and the leveling control of the leveling SACT that is not determined to be abnormal is continuously executed. In this way, it is possible to illuminate the forward region of the vehicle to ensure driving safety while reducing the likelihood of dazzling oncoming drivers.

Although the headlamps described above have both the swivel SACT and the leveling SACT, the present invention is also applicable to a headlamp having only the swivel SACT or the leveling SACT. Moreover, the present invention is applicable to any vehicle lamp, such as a fog lamp, which illuminates the forward region of the vehicle and in which a swivel control or a leveling control is executed.

Other implementations are within the scope of the claims.

What is claimed is:

1. A control system for a lamp of a vehicle, the control system comprising:
   a target irradiating direction setting unit configured to set, in accordance with an operating condition of the vehicle, a target irradiating direction of the lamp; and
   an actuator configured to control, based on a reference direction, an irradiating direction of the lamp to be directed in the target irradiating direction,
   wherein the actuator comprises a reference setting section arranged to execute a reference setting operation to set the irradiating direction of the lamp to be directed in the reference direction, and
   wherein the target irradiating direction setting unit comprises:
      a condition determining section arranged to determine whether the reference setting section has executed the reference setting operation based on information stored in memory indicating that the reference setting section has executed the reference setting operation; and
      a reference setting command section arranged so that, when the condition determining section determines that the reference setting section has not yet executed the reference setting operation, the reference setting command section instructs the reference setting section to execute the reference setting operation.

2. The control system according to claim 1 further comprising:
   a first switch through which the target irradiating direction setting unit is coupled to an in-vehicle power supply when the first switch is turned on; and
   a second switch through which the actuator is coupled to the in-vehicle power supply when the second switch is turned on, wherein the first and second switches are arranged separately and independently from each other, and wherein the actuator further comprises:
   a reference setting memory to store the information; and
   an initializing section which, when the second switch is turned on, initializes the reference setting memory.

3. The control system according to claim 2 wherein the target irradiating direction setting unit further comprises a calculating section arranged to calculate the target irradiating direction and send a control signal to the actuator, wherein the control signal corresponds to the target irradiating direction,
   wherein, when the first switch is turned on, the condition determining section is arranged to determine, before the calculating section sends the control signal, whether the reference setting section has executed the reference setting operation.

4. The control system according to claim 3 wherein the condition determining section is arranged to determine again, after the calculating section has sent the control signal, whether the reference setting section has executed the reference setting operation.

5. The control system according to claim 2 wherein the target irradiating direction setting unit further comprises a condition check command section arranged to send a condition check signal to the actuator, and
   wherein the actuator is arranged to send, in response to the condition check signal, and based on the information stored in the reference setting memory, a condition signal, which indicates whether the reference setting section has executed the reference setting operation, to the condition determining section.

6. The control system according to claim 1 further comprising a harness coupling the target irradiating direction setting unit and the actuator.

* * * * *